(12) United States Patent
Soshi et al.

(10) Patent No.: US 8,382,405 B2
(45) Date of Patent: Feb. 26, 2013

(54) SPINDLE DEVICE FOR MACHINE TOOL

(75) Inventors: Masakazu Soshi, Hadano (JP); Haruki Ishiguro, Yamatokoriyama (JP); Akihiro Mochizuki, Yamatokoriyama (JP)

(73) Assignees: Mori Seiki Co., Ltd., Yamatokoriyama-shi, Nara (JP); Intelligent Manufacturing Systems International, San Francisco, CA (US)

( * ) Notice: Subject to any disclaimer, the term of this patent is extended or adjusted under 35 U.S.C. 154(b) by 1147 days.

(21) Appl. No.: 12/264,473

(22) Filed: Nov. 4, 2008

(65) Prior Publication Data

US 2009/0136313 A1 May 28, 2009

(30) Foreign Application Priority Data

Nov. 22, 2007 (JP) ................. 2007-303182

(51) Int. Cl.
*B23Q 3/12* (2006.01)
*B23Q 11/10* (2006.01)

(52) U.S. Cl. ........... 409/233; 409/135; 409/137; 408/67

(58) Field of Classification Search ................. 409/135, 409/136, 137, 231, 232, 233; 408/58, 67, 408/68
See application file for complete search history.

(56) References Cited

U.S. PATENT DOCUMENTS

| | | | |
|---|---|---|---|
| 4,677,719 A * | 7/1987 | Link | 409/233 |
| 6,264,409 B1 * | 7/2001 | Date et al. | 409/233 |
| 7,473,060 B2 * | 1/2009 | Mohr et al. | 409/233 |
| 7,972,096 B2 * | 7/2011 | Kikkawa | 409/136 |
| 8,096,737 B2 * | 1/2012 | Tada et al. | 409/137 |

FOREIGN PATENT DOCUMENTS

| | | |
|---|---|---|
| DE | 10300042 A1 | 1/2005 |
| EP | 0796699 A1 | 9/1997 |
| EP | 1147840 A2 | 10/2001 |
| GB | 1266132 A | 3/1972 |
| JP | 1-81245 U | 5/1989 |
| JP | 6-8094 A | 1/1994 |

(Continued)

OTHER PUBLICATIONS

European Search Report dated Jan. 28, 2009, issued in corresponding European Patent Application No. 08168321.1.

(Continued)

*Primary Examiner* — David B Jones
(74) *Attorney, Agent, or Firm* — Westerman, Hattori, Daniels & Adrian, LLP

(57) ABSTRACT

A machine-tool spindle device includes: a spindle; a front housing for rotatably supporting the spindle; a first drive motor having a first rotor installed securely on the spindle and a first stator installed securely within the front housing; a rear housing installed on a rear end side of the spindle in the front housing; a second drive motor having an annular second rotor which is disposed coaxially to the spindle near a rear end of the spindle and which is supported rotatably within the rear housing, and a second stator installed securely within the rear housing; a connecting mechanism for connecting the rear end of the spindle and the second rotor and releasing the connection; and a clamping mechanism, disposed within the attaching hole of the spindle and within the second rotor, for clamping a tool attached to the spindle.

4 Claims, 3 Drawing Sheets

FOREIGN PATENT DOCUMENTS

| | | |
|---|---|---|
| JP | 6-170676 A | 6/1994 |
| JP | 11-99433 A | 4/1999 |
| JP | 11-099433 A | 4/1999 |
| WO | 92/01532 A1 | 2/1992 |
| WO | 2007/013107 A1 | 2/2007 |

OTHER PUBLICATIONS

Japanese Office Action dated Jul. 27, 2009, issued in corresponding Japanese Patent Application No. 2007-303182.

* cited by examiner

SPINDLE DEVICE FOR MACHINE TOOL

BACKGROUND OF THE INVENTION

1. Technical Field

The present invention relates to a spindle device for a machine tool, provided with: a spindle which is arranged rotatably about an axis and to which a tool is attached; and a drive motor for rotating the spindle about the axis.

2. Description of the Related Art

In a spindle device for a machine tool, such as a machining center, progress has been conventionally made in achieving a higher speed of a spindle rotation. The reason for this is to implement a higher speed machining to shorten a machining time, thereby achieving effective machining. On the other hand, depending on a quality of material for a workpiece, which is an object to be machined, the high-speed cutting is not possible, and thus, there may be a need of rotating the spindle at a low speed to carry out the machining. However, a spindle device corresponding to the high-speed cutting has small output at the time of the low-speed rotation, and thus, low-speed cutting cannot be carried out. As a result, there is a limit to a single machine tool carrying out all types of machining works.

On the other hand, conventionally, for a spindle device that has large output even at the time of the low-speed rotation, that which is disclosed in JP-A-H11-99433 (hereinafter, referred to as Patent Document 1), for example, is proposed, but in Patent Document 1, instead of a tool, a workpiece is attached to the spindle. The spindle device is provided with: a housing; a first rotation axis and a second rotation axis disposed in a manner to be kept apart by a distance in an axial direction within the housing; a spindle connected to one end side of the second rotation axis; a first drive motor and a second drive motor for causing each rotation axis to rotate about its axis; and a clutch mechanism disposed between the first rotation axis and the second rotation axis.

The first drive motor includes a first rotor arranged on an outer circumferential surface of the first rotation axis and a first stator arranged on an inner circumferential surface of the housing. For the first drive motor, that which has large output even at the time of the low-speed rotation is used. On the other hand, the second drive motor includes a second rotor arranged on an outer circumferential surface of the second rotation axis and a second stator arranged on an inner circumferential surface of the housing. For the second drive motor, that which is adapted for the high-speed rotation is used. The clutch mechanism carries out a connecting operation for connecting the one end side of the first rotation axis and the other end side of the second rotation axis, and a releasing operation for releasing the connection between the one end side of the first rotation axis and the other end side of the second rotation axis.

In this spindle device, at the time of the high-speed rotation of the spindle, the second drive motor is driven in a state that the connection between the first rotation axis and the second rotation axis is released by the clutch mechanism; and at the time of the low-speed rotation of the spindle, the first drive motor is driven in a state that the connection between the first rotation axis and the second rotation axis is released by the clutch mechanism.

In the spindle device to which the tool is attached, a clamping device for clamping/unclamping the attached tool is generally placed. This clamping device draws the tool into an attaching hole of the spindle for clamping. The clamping device is configured by: a drawing member, disposed movably in an axial direction within the attaching hole of the spindle, for drawing the tool into the attaching hole; and a drive mechanism, placed on the rear end side of the spindle, for clamping and unclamping the tool by the drawing member.

Therefore, it is not possible to directly apply the spindle device disclosed in the Patent Document 1 so configured that the spindle, the first rotation axis, the clutch mechanism, and the second rotation axis are disposed in a straight line in the axial direction of the spindle, to the spindle device in which the above-described clamping device is arranged. Further, when the spindle, the first rotation axis, the clutch mechanism, and the second rotation axis are merely disposed in the axial direction of the spindle, a length in the spindle axial direction in the spindle device is elongated, thereby resulting in a problem in that a device configuration becomes large.

In view of the above-described circumstances, the present invention has been achieved, and an object thereof is to provide a spindle device for a machine tool capable of being compatible with both high-speed cutting and low-speed cutting while remaining compact in size.

BRIEF SUMMARY OF THE INVENTION

In accordance with the present invention to solve the aforesaid problems, there is provided a spindle device for a machine tool which comprises:

a spindle having an attaching hole penetrating in an axial direction, the attaching hole being attached with a tool; a first housing, having a retaining hole, for supporting within the retaining hole the spindle rotatably about its axis; a first drive motor for rotating the spindle; clamping means for clamping the tool attached into the attaching hole of the spindle; control means for controlling an action of the first drive motor; the first drive motor being configured by: a first rotor installed securely on an outer circumferential surface of the spindle; and a first stator installed securely on an inner circumferential surface of the retaining hole of the first housing in a manner to be kept apart by a distance radially outwardly from the first rotor; and the clamping means being including: a drawing member, disposed within the attaching hole of the spindle movably in a direction of an axis thereof, for drawing the tool into the attaching hole; and a drive mechanism, placed on a rear end side of the spindle, for unclamping the clamped tool drawn into the attaching hole by the drawing member, the spindle device for a machine tool, including:

a second housing which is formed to have a hollow portion therein and which is so arranged at a rear of the first housing that a rear end of the spindle is positioned within the hollow portion;

a second drive motor, of which an action is controlled by the control means, for rotating the spindle, the second drive motor including: an annular second rotor which is disposed so as to be coaxially to the spindle at the rear end side of the spindle and to contain the drive mechanism therein and which is supported within the hollow portion by the second housing in a manner to rotate freely about the axis; and a second stator installed securely on an inner circumferential surface of the hollow portion of the second housing in a manner to be kept apart by a distance radially outwardly from the second rotor; and connecting means which is disposed within the second housing and which carries out a connecting operation for connecting the rear end of the spindle and the second rotor and a releasing operation for releasing the connection between the rear end of the spindle and the second rotor, the connecting means of which an action is controlled by the control means.

According to the present invention, in a state that the connection between the rear end of the spindle and the second rotor is released by the releasing operation of the connecting means, only the first drive motor is driven to rotate the spindle about the axis. On the other hand, in a state that the rear end of the spindle and the second rotor are connected by the connecting operation of the connecting means, only the second drive motor or both the first drive motor and the second drive motor are driven to rotate the spindle about the axis.

Therefore, when for the first drive motor, that which is capable of rotating the spindle at a high speed is employed and for the second drive motor, that which can provide large output even at the time of a low-speed rotation, such as a torque motor and a synchronous motor, is employed, both high-speed cutting and low-speed cutting can be carried out.

Further, in the present invention, the second rotor of the second drive motor is so disposed that the drive mechanism of the clamping means is contained inside the second rotor. Thus, the second drive motor can be disposed while effectively utilizing a space for disposing the drive mechanism, which has been conventionally needed. This eliminates a need of elongating the spindle device in an axial direction of the spindle, and thus, the second drive motor can be arranged in the spindle device. Therefore, even when the second drive motor is arranged, the spindle device may be made as compact as conventional configurations in size.

Further, the drive mechanism of the clamping means includes: a cylinder, which includes a cylindrical member formed in a stepped shape having a large diameter portion and a small diameter portion, which is disposed so as to be coaxially to the spindle within the hollow portion of the second housing and to dispose the small diameter portion on a spindle side, and which has an end opposite to a small diameter portion side of the large diameter portion being installed securely on the second housing; and a first piston, fitted by insertion into the cylinder movably in an axial direction, for driving the drawing member, the second rotor of the second drive motor is supported rotatably on an outer circumferential surface of the large diameter portion of the cylinder, and the connecting means includes: a cylindrical second piston fitted outside the small diameter portion of the cylinder movably in its axial direction; a coupling which includes an annular first member, second member, and third member, each of which is disposed coaxially to the spindle and of which one end surfaces are formed with radial teeth, respectively, and which is so configured that the third member has one end surface thereof being facing the one end surfaces of the first member and the second member and the teeth of the third member and the teeth of the first member and the second member can be meshed with each other, the coupling being so configured that the first member is installed securely on a spindle side of the second rotor so as to protrude more inwardly than an inner circumferential surface of the second rotor, the second member is installed securely on the rear end of the spindle so as to be disposed within a ring of the first member, and the third member is supported rotatably on an outer circumferential surface of the second piston; a first hydraulic chamber and a second hydraulic chamber formed between the second piston and the cylinder in a manner to be kept apart by a distance in an axial direction of the second piston; and a pressure-oil supplying section which supplies an interior of the first hydraulic chamber with pressure oil to move the second piston in a direction closer to the spindle and supplies an interior of the second hydraulic chamber with the pressure oil to move the second piston in a direction apart from the spindle, the pressure-oil supplying section of which an action is controlled by the control means.

With this configuration, the connecting operation and the releasing operation of the connecting means are carried out as follows:

That is, in the connecting operation, the pressure oil is supplied to the interior of the first hydraulic chamber by the pressure-oil supplying section, and thus, the second piston is moved in a direction closer to the spindle. Thereby, the teeth on the facing surfaces of the first member and the second member and that on the facing surface of the third member are meshed, and as a result, the rear end of the spindle and the second rotor are connected via the coupling. On the other hand, in the releasing operation, the pressure oil is supplied to the interior of the second hydraulic chamber by the pressure-oil supplying section, and thus, the second piston is moved in a direction apart from the spindle. Thereby, the meshing relationship between the teeth on the facing surfaces of the first member and the second member and that on the facing surface of the third member is released, and as a result, the connection between the rear end of the spindle and the second rotor is released.

Therefore, in this case also, it is possible to switch between when the spindle is driven by the first drive motor and when the spindle is driven by at least the second drive motor, and thus, an effect similar to that described above can be obtained. Further, the second rotor is disposed outside the cylinder and the third member, and thus, the clamping means and the connecting means can be more efficiently disposed. As a result, a more compact device configuration can be embodied.

In addition, the control means is preferably configured to rotate the spindle by switching between when the connection between the spindle and the second rotor is released by the releasing operation of the connecting means thereby to drive the first drive motor and when the spindle and the second rotor are connected by the connecting operation of the connecting means thereby to drive at least the second drive motor.

As described above, according to the spindle device for a machine tool according to the present invention, the spindle device for a machine tool is compatible with both high-speed cutting and low-speed cutting while maintaining the spindle device for a machine tool compact in size.

DETAILED DESCRIPTION OF THE INVENTION

Figure 1:
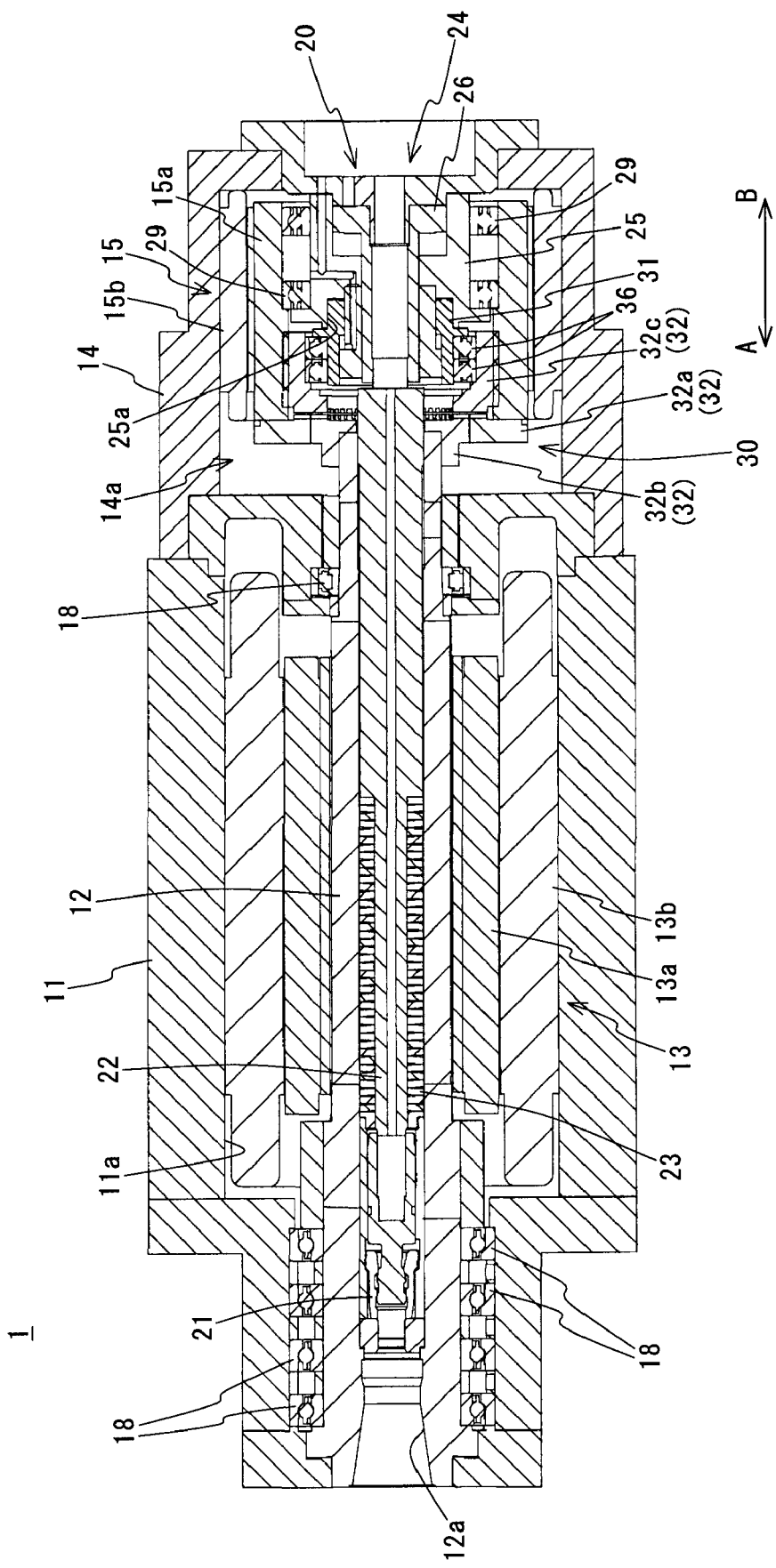
FIG. 1 is a sectional view showing a schematic configuration of a spindle device for a machine tool according to one embodiment of the present invention.
Figure 2:
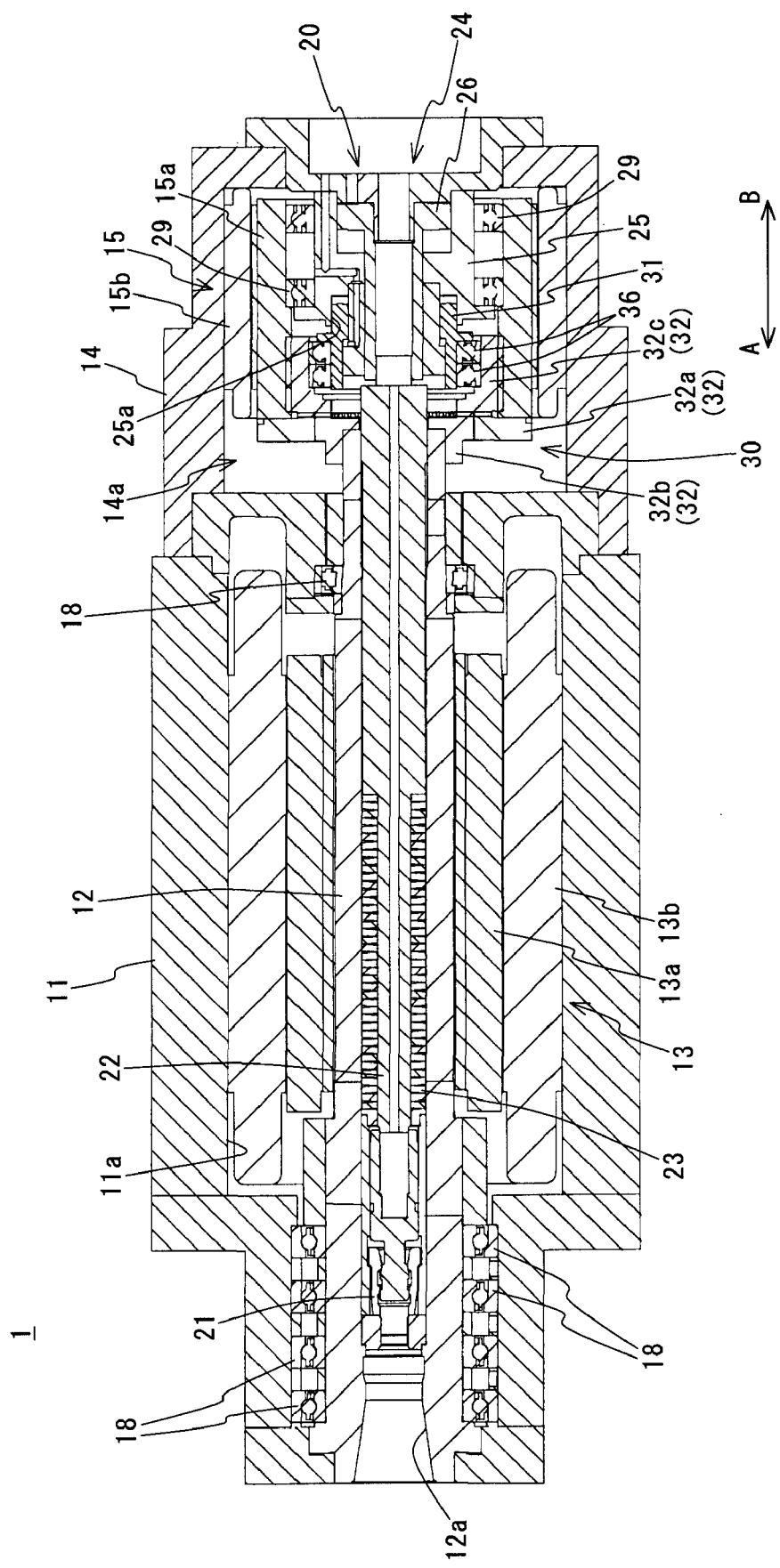
FIG. 2 is a sectional view showing the schematic configuration of the spindle device for a machine tool according to one embodiment of the present invention.
Figure 3:
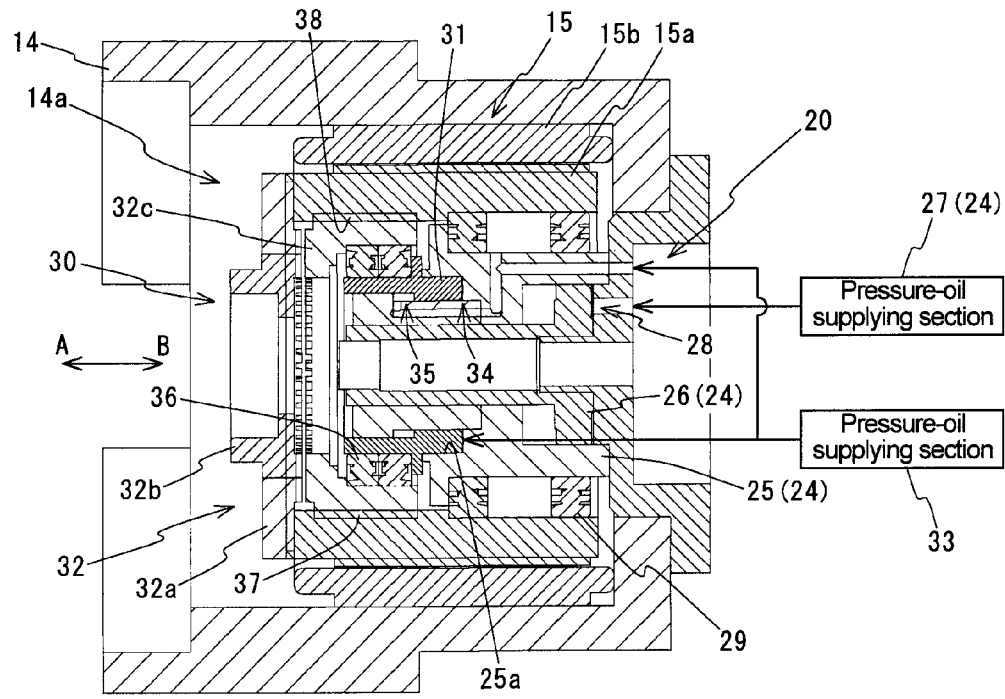
FIG. 3 is a detailed view of an interior of a rear housing.
Figure 4:
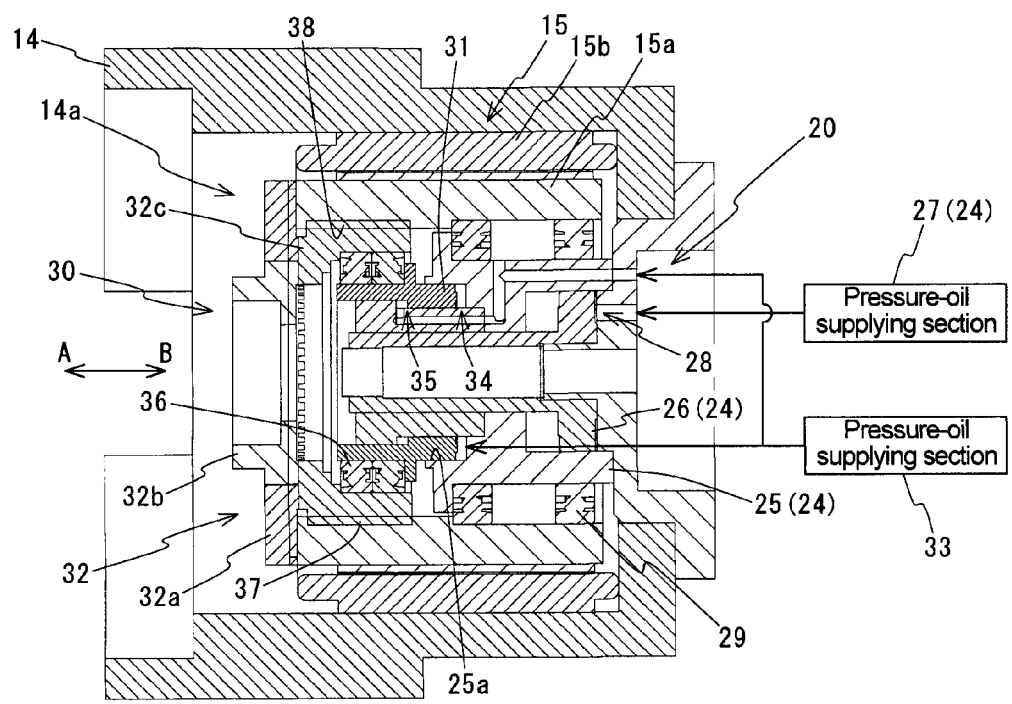
FIG. 4 is a detailed view of the interior of the rear housing.

A specific embodiment of the present invention is described as follows based on the appended drawings. FIG. 1 and FIG. 2 are sectional views showing a schematic configuration of a spindle device for a machine tool according to one embodiment of the present invention. FIG. 3 and FIG. 4 are detailed views of an interior of a rear housing.

As shown in FIG. 1 and FIG. 3, a spindle device 1 for a machine tool of the present embodiment is provided with: a front housing 11; a spindle 12 rotatably supported about an axis within the front housing 11 and having a tip end thereof being attached with a tool; a first drive motor 13 disposed within the front housing 11; a rear housing 14 installed on a rear end side of the spindle 12 in the front housing 11; a second drive motor 15 disposed within the rear housing 14; a clamping mechanism 20 for clamping/unclamping the tool attached to the tip end of the spindle 12; a connecting mechanism 30 for carrying out a connecting operation so as to connect the spindle 12 and the second drive motor 15 and for carrying out a releasing operation so as to release the connection between the spindle 12 and the second drive motor 15; and a control device (not shown) for controlling actions of the respective drive motors 13 and 15, the clamping mechanism 20, and the connecting mechanism 30.

The front housing 11 has a retaining hole 11a, and supports in a manner that the spindle 12 rotates freely on an inner circumferential surface of this retaining hole 11a via a bearing 18 and a rear end of the spindle 12 protrudes from the retaining hole 11a. In addition, the spindle 12 has an attaching hole 12a that opens to and penetrates both end surfaces and that is formed in a tapered shape on the tip end side of the spindle 12, enabling the tool to be attached to the tip end side of the spindle 12 of this attaching hole 12a. The rear housing 14 is formed in a cylindrical shape having one opened end and a hollow portion, and the rear end of the spindle 12 is positioned within this hollow portion 14a.

The first drive motor 13 is configured by: a first rotor 13a installed securely on an outer circumferential surface of the spindle 12; and a first stator 13b which is installed securely on an inner circumferential surface of the retaining hole 11a of the front housing 11 in a manner to be kept apart by a distance radially outwardly from the first rotor 13a. Additionally, as for this first drive motor 13, that which can rotate the spindle 12 at a high speed is employed, and is configured, for example, by an induction motor or a synchronous motor.

The second drive motor 15 is disposed near the rear end of the spindle 12 coaxially to the axis of this spindle 12, and is configured by: an annular second rotor 15a supported by the rear housing 14 via a cylinder 25, described later, of the clamping mechanism 20; and a second stator 15b which is installed securely on an inner circumferential surface of the hollow portion 14a in the rear housing 14 in a manner to be kept apart by a distance radially outwardly from the second rotor 15a. Additionally, for this second drive motor 15, that which can achieve large output even when the spindle 12 is rotated at a low speed is employed, and is configured, for example, by a torque motor or a synchronous motor. In addition, the torque motor or the synchronous motor is provided with a configuration with a large rotor diameter in general, and thus, such a motor is effective for disposing the cylinder 25, a piston 26 of the connecting mechanism 30, and a third member 32c of a coupling 32, which will be described later, within this rotor.

The clamping mechanism 20 is configured by: a collet 21 and a drawbar 22 movably disposed within the attaching hole 12a of the spindle 12 in its axial direction (the direction of arrow A and the direction of arrow B); a plurality of coned disk springs 23 placed within the attaching hole 12a of the spindle 12 to bias the drawbar 22 in the direction of arrow B; and a drive mechanism 24 placed on the rear end side of the spindle 12 to move the collet 21 and the drawbar 22 in the direction of arrow A against a biasing force of the coned disk springs 23.

The collet 21 and the drawbar 22 are for drawing the tool into the attaching hole 12a of the spindle 12, the collet 21 is configured to be capable of gripping a rear end of the tool, and the drawbar 22 is engaged with the collet 21.

The drive mechanism 24 is configured by: a cylindrical cylinder 25 which is disposed in a manner to be kept apart by a distance from and within the second rotor 15a of the second drive motor 15, which is disposed coaxially to the axis of the spindle 12 in a manner to be kept apart by a distance from a rear end of the spindle 12, and of which the end opposite to a spindle 12 side is installed securely on an end inner surface of the rear housing 14, opposite to an opening side; a piston 26 movably fitted by insertion into the cylinder 25 in the axial direction (the direction of arrow A and the direction of arrow B) thereof; and a pressure-oil supplying section 27 supplying pressure oil into the cylinder 25.

The cylinder 25 is formed in a stepped shape having a small outer diameter on the spindle 12 side and a large outer diameter opposite to the spindle 12 side; and supports the second rotor 15a rotatably about its axis on an outer circumferential surface of the large diameter portion via a bearing 29. In addition, the stepped part of the cylinder 25 is formed with an annular groove 25a opening to an outer surface on the spindle 12 side.

In the piston 26, the end thereof on the spindle 12 side is in contact with a rear end surface of the drawbar 22. Among this piston 26, the inner surface of the cylinder 25, and the inner surface, of the rear housing 14, of the end opposite to the opening side, a hydraulic chamber 28 is formed. The pressure-oil supplying section 27 supplies the pressure oil within this hydraulic chamber 28 so as to move the piston 26 in the direction of arrow A.

Then, in this clamping mechanism 20, the pressure oil is supplied within the hydraulic chamber 28 by the pressure-oil supplying section 27, and thereby, the piston 26, the drawbar 22, and the collet 21 are moved in the direction of arrow A against the biasing force of the coned disk springs 23. As a result, gripping of the tool by the collet 21 is released, and the tool is allowed to be removed from the attaching hole 12a of the spindle 12. On the other hand, when the supply of the pressure oil by the pressure-oil supplying section 27 is stopped, the piston 26, the drawbar 22, and the collet 21 are moved in the direction of arrow B due to the biasing force of the coned disk springs 23. As a result, the tool is gripped by the collet 21, drawn into the attaching hole 12a of the spindle 12, and is clamped.

The connecting mechanism 30 is configured by: a cylindrically shaped piston 31 which is formed to have a hollow portion therein and which is fitted outside the small diameter portion of the cylinder 25 so as to be movable in the axial direction (the direction of arrow A and the direction of arrow B); a coupling 32 for transferring a torque of the second drive motor 15 to the spindle 12; and a pressure-oil supplying section 33 for supplying pressure oil so as to move the piston 31.

In the piston 31, an end thereof opposite to the spindle 12 side is fitted by insertion into the annular groove 25a of the cylinder 25. Between this piston 31 and the annular groove 25a, a first hydraulic chamber 34 is formed. In addition, between an inner surface of the piston 31 and an outer surface of the cylinder 25, closer to the spindle 12 side than this first hydraulic chamber 34, a second hydraulic chamber 35 is formed.

The coupling 32 includes an annular first member 32a, a second member 32b, and a third member 33c, each of which is disposed coaxially to the axis of the spindle 12. The first member 32a is installed securely on an end of the second rotor 15a on the spindle 12 side so as to protrude more inwardly than the inner circumferential surface of this second rotor 15a. The second member 32b is installed securely on the rear end of the spindle 12 and disposed in a ring of the first member 32a. The third member 32c is supported so that it faces the first member 32a and the second member 32b and is rotatable about the axis on the outer circumferential surface of the piston 31 via the bearing 36. In addition, on surfaces of the first member 32a and the second member 32b facing the third member 32c, and on surface of the third member 32c facing the first member 32a and the second member 32b, teeth meshing with each other are formed in a radial pattern. Additionally, due to an engaging relationship between an engaging portion (e.g. a key or a spline) 37 formed on the outer circumferential surface of the third member 32c and an engaging portion (e.g. a key way or a spline groove) 38 formed on the inner circumferential surface of the second rotor 15a, the third member 32c is irrotational to the second rotor 15a and is movable in the axial direction (the direction of arrow A and the direction of arrow B) of this third member 32c. The second rotor 15a is supported by the small diameter portion of the cylinder 25 via the third member 32c and the piston 31.

The pressure-oil supplying section 33 supplies the pressure oil within the first hydraulic chamber 34 so as to move the piston 31 in the direction of arrow A, and also supplies the pressure oil within the second hydraulic chamber 35 so as to move the piston 31 in the direction of arrow B.

Then, in this connecting mechanism 30, the pressure oil is supplied within the first hydraulic chamber 34 by the pressure-oil supplying section 33, and thus, the piston 31 and the third member 32c are moved in the direction of arrow A. As a result, the teeth of the first member 32a and the second member 32b and the teeth of the third member 32c are meshed, thereby connecting the rear end of the spindle 12 and the second rotor 15a via the aforementioned coupling 32. Thereby, the connecting operation is carried out (see FIG. 2 and FIG. 4). On the other hand, when the pressure oil is supplied within the second hydraulic chamber 35 by the pressure-oil supplying section 33, the piston 31 and the third member 32c are moved in the direction of arrow B. As a result, the meshing relationship between the teeth of the first member 32a and the second member 32b and the teeth of the third member 32c is released, and the connection between the rear end of the spindle 12 and the second rotor 15a is released. Thereby, the releasing operation is carried out (see FIG. 1 and FIG. 3).

The control device (not shown) controls the first drive motor 13, the second drive motor 15, the pressure-oil supplying section 27 of the clamping mechanism 20, and the pressure-oil supplying section 33 of the connecting mechanism 30. As a result of this control, the control device switches, for example, between a time at which the connection between the spindle 12 and the second rotor 15a is released by the releasing operation of the connecting mechanism 30 thereby to drive the first drive motor 13; and a time at which the spindle 12 and the second rotor 15a are connected by the connecting operation of the connecting mechanism 30 thereby to drive the first drive motor 13 and the second drive motor 15, in order to rotate the spindle 12. Additionally, the control device (not shown) controls the drive motors 13 and 15 so that a rotational speed of the spindle 12, which is detected by a rotary encoder (not shown) disposed between the first drive motor 13 and the coupling 32 in the axial direction of the spindle 12, for example, reaches a predetermined rotational speed.

According to the spindle device 1 for a machine tool of the present embodiment configured as above, when the first drive motor 13 only is driven and when both the first drive motor 13 and the second drive motor 15 are driven are switched by the control device (not shown), and the rotation of the spindle 12 is controlled. However, as described above, in the present embodiment, as for the first drive motor 13, that which can rotate the spindle 12 at a high speed is used, and as for the second drive motor 15, that which can achieve large output even at the time of a rotation at a low speed is used. As a result, it becomes possible to be compatible with both high-speed cutting and low-speed cutting.

In addition, in the present embodiment, the second rotor 15a of the second drive motor 15 is so disposed that the cylinder 25, the piston 31 of the connecting mechanism 30, and the third member 32c of the coupling 32 are contained in the interior thereof. Thus, the second drive motor 15 and the connecting mechanism 30 may be disposed while effectively using the space for disposing a drive mechanism of a clamping device that has conventionally been required. In addition, the second drive motor 15 and the connecting mechanism 30 may be arranged in the spindle device 1 without elongating the spindle device 1 in the axial direction of the spindle 12. Therefore, the spindle device 1 may be made as compact as conventional configurations in size, even when the second drive motor 15 and connecting mechanism 30 are arranged.

In addition, at the time of connecting the spindle 12 and the second drive motor 15, not only the second drive motor 15 but also the first drive motor 13 are driven. Therefore, as compared to a case that the second drive motor 15 is driven alone, a larger output may be generated.

As described above, one embodiment of the present invention is described, and a specific mode in which the present invention can be implemented is not limited thereto at all.

In the above embodiment, when the spindle 12 and the second rotor 15a of the second drive motor 15 are connected, both the first drive motor 13 and the second drive motor 15 are designed to be driven. However, the second drive motor 15 may be driven alone. In addition, the control mode of the first drive motor 13, the second drive motor 15, the pressure-oil supplying section 27 of the clamping mechanism 20, and the pressure-oil supplying section 33 of the connecting mechanism 30 by the control device (not shown) is not limited in any way by what has been described above.

In addition, the first drive motor 13 is not limited by what has been described above, as anything may be used as long as it is a drive motor that can rotate the spindle 12 at a high speed. Likewise, the second drive motor 15 is not limited in any way, either, as anything may be used as long as it is a drive motor that can achieve large output, even when the spindle 12 is rotated at a low speed.

The invention claimed is:

1. A spindle device for a machine tool, comprising:
 a spindle having an attaching hole which opens in a front end surface and a rear end surface of the spindle and penetrates through the spindle along an axis of the spindle, the spindle having a tool attaching portion to which a tool is attached formed at a front end portion of the attaching hole;
 a first housing having a retaining hole and supporting the spindle within the retaining hole so that the spindle is rotatable about the axis thereof;
 a first drive motor for rotating the spindle;
 clamping means for clamping the tool attached to the tool attaching portion of the spindle to fix the tool to the tool attaching portion;
 control means for controlling an action of the first drive motor;
 the first drive motor comprising: a cylindrical first rotor installed securely on an outer circumferential surface of the spindle; and a first stator installed securely on an inner circumferential surface of the retaining hole of the first housing, the first stator being disposed at a distance from the first rotor radially outwardly of the first rotor; and
 the clamping means comprising: a drawing member which is disposed within the attaching hole of the spindle so as to be movable in forward and backward directions along an axis thereof, and which moves in the backward direction to draw the tool into the tool attaching portion and clamp the tool; and a drive mechanism which is placed on a rear-end side of the spindle, and which moves the drawing member in the forward direction to unclamp the tool clamped to the tool attaching portion by the drawing member, wherein the spindle device for a machine tool further comprises:

a second housing which is formed to have a hollow portion therein and which is connected to a rear portion of the first housing so that a rear end portion of the spindle is positioned within the hollow portion;

a second drive motor which is disposed within the hollowing portion of the second housing and an action of which is controlled by the control means, the second drive motor comprising: a cylindrical second rotor which is disposed coaxially with the spindle on the rear-end side of the spindle and which is supported so as to be rotatable about an axis thereof; and a second stator installed securely on an inner circumferential surface of the hollow portion of the second housing, the second stator being disposed at a distance from the second rotor radially outwardly of the second rotor; and a connecting mechanism which is disposed within the second housing and has at least a first member installed securely on the second rotor and a second member installed securely on the rear end portion of the spindle, which connects the spindle and the second rotor by connecting the first member and the second member and releases the connection between the spindle and the second rotor by releasing the connection between the first member and the second member, and an action of which is controlled by the control means, and the drive mechanism is disposed within the second rotor.

2. The spindle device for a machine tool according to claim 1, wherein the second drive motor comprises a torque motor or a synchronous motor.

3. The spindle device for a machine tool according to claim 1 or 2, wherein the drive mechanism of the clamping means has:

a cylinder, which comprises a cylindrical member formed in a stepped shape having a large diameter portion and a small diameter portion, which is disposed within the second rotor so that it is coaxial with the spindle and the small diameter portion is closer to the spindle than the large diameter portion, and an end of the large diameter portion of which is installed securely on the second housing; and a first piston which is fitted by insertion into the cylinder so as to be movable along an axial direction thereof, and which is connected to the drawing member to drive the drawing member, the second rotor of the second drive motor is supported by an outer circumferential surface of the large diameter portion of the cylinder so as to be rotatable, and the connecting mechanism comprises:

a cylindrical second piston fitted outside the small diameter portion of the cylinder so as to be movable in an axial direction thereof;

a coupling comprising an annular first member, second member, and third member, each of which is disposed coaxially with the spindle and has radial teeth formed on one end surface thereof, the coupling being configured so that the one end surface of the third member faces the one end surfaces of the first member and the second member and the teeth of the third member and the teeth of the first member and the second member can be meshed with each other, the first member being installed securely on a spindle-side surface of the second rotor so that the teeth of the first member are positioned more inwardly than an inner circumferential surface of the second rotor, the second member being installed securely on the rear end portion of the spindle and disposed within a ring of the first member, and the third member being supported on an outer circumferential surface of the second piston so as to be rotatable;

a first hydraulic chamber and a second hydraulic chamber which are formed at distance from each other in an axial direction of the second piston between the second piston and the cylinder; and a pressure-oil supplying section which supplies pressure oil into the first hydraulic chamber to move the second piston in a direction toward the spindle and supplies the pressure oil into the second hydraulic chamber to move the second piston in a direction apart from the spindle, and an action of which is controlled by the control means.

4. The spindle device for a machine tool according to claim 1 or 2, wherein the control means is configured to switch between a time at which the connection between the spindle and the second rotor is released by the connecting mechanism and the first drive motor is driven and a time at which the spindle and the second rotor are connected by the connecting mechanism and at least the second drive motor is driven, in order to rotate the spindle.

* * * * *